United States Patent [19]
Spratt et al.

[11] 3,887,921
[45] June 3, 1975

[54] ADAPTIVE RATE LIMITER

[75] Inventors: Brendan J. Spratt, Boca Raton; James C. Lunsden, Plantation, both of Fla.

[73] Assignee: The Bendix Corporation, Southfield, Mich.

[22] Filed: Mar. 25, 1974

[21] Appl. No.: 454,508

[52] U.S. Cl............ 343/106 R; 244/77 S; 343/107
[51] Int. Cl................................................ G01s 1/46
[58] Field of Search ........ 343/106 R, 107; 244/77 S

[56] References Cited
UNITED STATES PATENTS

| | | |
|---|---|---|
| 3,098,228 | 7/1963 | Medlinski et al. .................. 343/107 |
| 3,201,675 | 8/1965 | Curran et al. .................. 244/77 S X |
| 3,792,473 | 2/1974 | Sawicki........................... 343/106 R |

Primary Examiner—Maynard R. Wilbur
Assistant Examiner—Richard E. Berger
Attorney, Agent, or Firm—W. G. Christoforo; Bruce L. Lamb

[57] ABSTRACT

An adaptive rate filter for use in aircraft navigation systems attenuates or eliminates the effect of scalloping associated with certain VOR ranges. A pair of operational amplifiers connected serially together comprise a unity inverter with a voltage proportional to VOR or displacement being the input and the output signal being applied to a constant deviation indicator and/or an autopilot. The first operational amplifier is connected as a differential amplifier whose output is limited in accordance with various aircraft parameters, while the second operational amplifier integrates the limited output of the first operational amplifier to generate the adaptive rate filter output signal. Means are also shown for increasing the speed of the integrator if the filter output deviates from the filter input by more than a predetermined amount.

15 Claims, 3 Drawing Figures

ADAPTIVE RATE LIMITER

BACKGROUND OF THE INVENTION

This invention relates to improvement to aircraft navigation systems of the type which respond to navigational signals received from VORTAC, TACAN or similar stations. The invention particularly relates to means for eliminating and attenuating the effects of scalloping which is normally associated with certain VOR tracks and have special application in VOR or area navigation instruments.

Area navigation systems are known which, briefly, solve the navigational triangle having vortices which include the aircraft, a VORTAC, TACAN or like station and a selected way point, which is spaced apart from the station, to permit the aircraft to fly over the selected way point. This triangle is solved in accordance with signals received at the aircraft from the station which include a bearing signal (herein termed a VOR signal or VOR radial) having information related to the bearing of the aircraft from the station, and a distance signal (herein termed a DME signal) related to the distance of the aircraft from the station. The form of these signals is known in the art and need not be repeated here. Ideally, the VOR signals define predefined radial lines emanating from the transmitting station so that a receiving aircraft can determine the bearing of the aircraft from the station. However, under certain circumstances normally associated with the terrain over which the VOR signals are radiated, these VOR signals are bent or perturbated from a true radial at various distances from the station. This phenomena is termed scalloping and a perturbation of a VOR signal is termed a scallop. As a result of scallops, an aircraft headed toward a station on a true radial and having an indicator pointed toward the station will find that the indicator will deviate from the true heading of the aircraft toward the station in accordance with the scallops. This, of course, is a false indication and if not compensated for or eliminated will result in an erroneous change of course so that a sinuous course will be flown toward the station rather than a straight course.

Typically, the VOR perturbations are, in the case of a mobile receiver such as an aircraft, manifested in the form of periodic, very low frequency variations of the VOR signal. Periods of 30 to 60 seconds with bearing deviations up to 5° have been experienced in practice.

Area navigation tracks are generally flown by reference to a Course Deviation Indicator (CDI). Track error is represented by the deflection of the CDI needle, left or right of center. To fly a selected track, the pilot (or autopilot) maintains the needle in the center of the indicator. Typically, enroute sensitivity of this indicator is ±5 nm (nautical miles) for full scale deflection (±5 dots). At a range of 57.3 nm from the station, a periodic angular error of 5° would cause a periodic full scale deflection of the CDI. This is obviously unacceptable.

In considering the various forms of filtering which can be used to minimize the effects of VOR signal scalloping, the matter of filter lag is of primary importance. Current specifications allow a maximum of 0.5 seconds lag to ensure accuracy in readout and stability of an autopilot to which the CDI signal may be coupled.

For a simple single pole CR filter, the time lag is equal to the time constant ($t = RC$). Assuming a scallop frequency of 0.2 radians per second (period = 31.4 seconds) and a minimum acceptable attenuation of 12 db, the cut off frequency of the filter is:

$$4 \omega c = \frac{1}{CR}$$

or $$CR = 20 \text{ seconds.}$$

With this filter installed, an aircraft flying past a VOR station at 600 knots would display a position lagging its true position by 3⅓ nm. This also is unacceptable. Increasing the number of filter poles to improve the attenuation characteristic can only lead to increased delay.

Rate filters which adapt in accordance with various parameters of the system have been proposed. These have normally been electromechanical devices which use servomechanisms and which thus adapt to a limited number of system parameters.

SUMMARY OF THE INVENTION

The adaptive rate filter disclosed herein offers the best solution to the present problem in what it can be tailored to all the dynamic parameters of the system as is most advantageous when used in an area navigation system. In addition, the adaptive rate filter disclosed can be embodied in essential solid state form for savings of weight, size and complexity and economy of manufacture.

In considering the aforementioned navigation triangle solved by area navigation systems, it becomes evident that an aircraft precisely flying a selected track does not experience, or expect to experience, displacement from the track. Under such conditions, the required system filter bandwidth approaches zero. If now the aircraft turns to a track differing from the selected track by A degrees, the anticipated rate of change of displacement from the selected track is V sin A nm per second, where V is the aircraft velocity in knots. It thus becomes clear that for this application the characteristics of an adaptive rate filter should be a function of both relative aircraft heading and aircraft velocity. In practice, the degree to which an ideal filter can be approximated is limited by the accuracy with which the controlling function can be established. For example, assume the following:

Relative Heading Accuracy (A)   ±5°
Ground Speed Accuracy ($V_E$)   ±50 knots
Nominal Ground Speed (V)   550 knots
Maximum Cross Track Velocity = ($V_E + V$) = 600 knots = 1/6 nm/sec.
Maximum Cross Track Velocity Due to Relative Heading Error = 600 sin 5° = 0.0145 nm/sec.

The adaptive rate filter to be described automatically adjusts to this last value. If an aircraft equipped with this adaptive rate filter is exposed to scalloping of 5° at a period of 31.4 seconds, the CDI perturbation will be reduced from the full scale deflection (±5 nm) previously noted to ±0.46 nm (31.4 × 0.0145), or less than a half dot deflection, which is acceptable and practically negligible. Note particularly that the amplitude of the filter output, when rate limiting, is independent of the amplitude of the perturbation.

Assume that upon arrival at the terminal area the aircraft reduces speed to an indicated 250 knots. In this case the maximum cross track velocity due to heading error is 300 sin 5° or 0.00726 nm/sec. Thus, for the same level of scalloping the CDI perturbations are reduced to less than a quarter dot or about the width of the CDI needle. Further reduction in ground speed will result in further improvement in CDI stability.

The adaptive rate filter to be described in detail below basically consists of a pair of operational amplifiers connected serially and comprising a unity inverter. The first operational amplifier is connected as a comparator or differential amplifier whose output is controlled in accordance with various system dynamic parameters. This limited output is integrated by the second operational amplifier. A voltage proportional to VOR or displacement comprises the limiter input while the output signal is used to drive the CDI and an autopilot if desired. The various system dynamic parameters which can be used to control the output of the comparator can be heading, speed, distance from station, etc. In addition, a voltage comparator can be provided to automatically speed up the integrator should the filter output deviate from its input by more than a predetermined amount.

It is thus an object of this invention to provide a solid state adaptive rate filter for use with aircraft instruments.

A further object of the invention is to provide an adaptive rate filter which can respond to a large plurality of dynamic conditions.

Another object of the invention is to provide an adaptive rate filter which is particularly adapted for use in an aircraft area navigation system.

These and other objects of the invention will become obvious from a reading and understanding of the following description, drawings and claims.

DESCRIPTION OF THE PREFERRED EMBODIMENT

Figure 1:
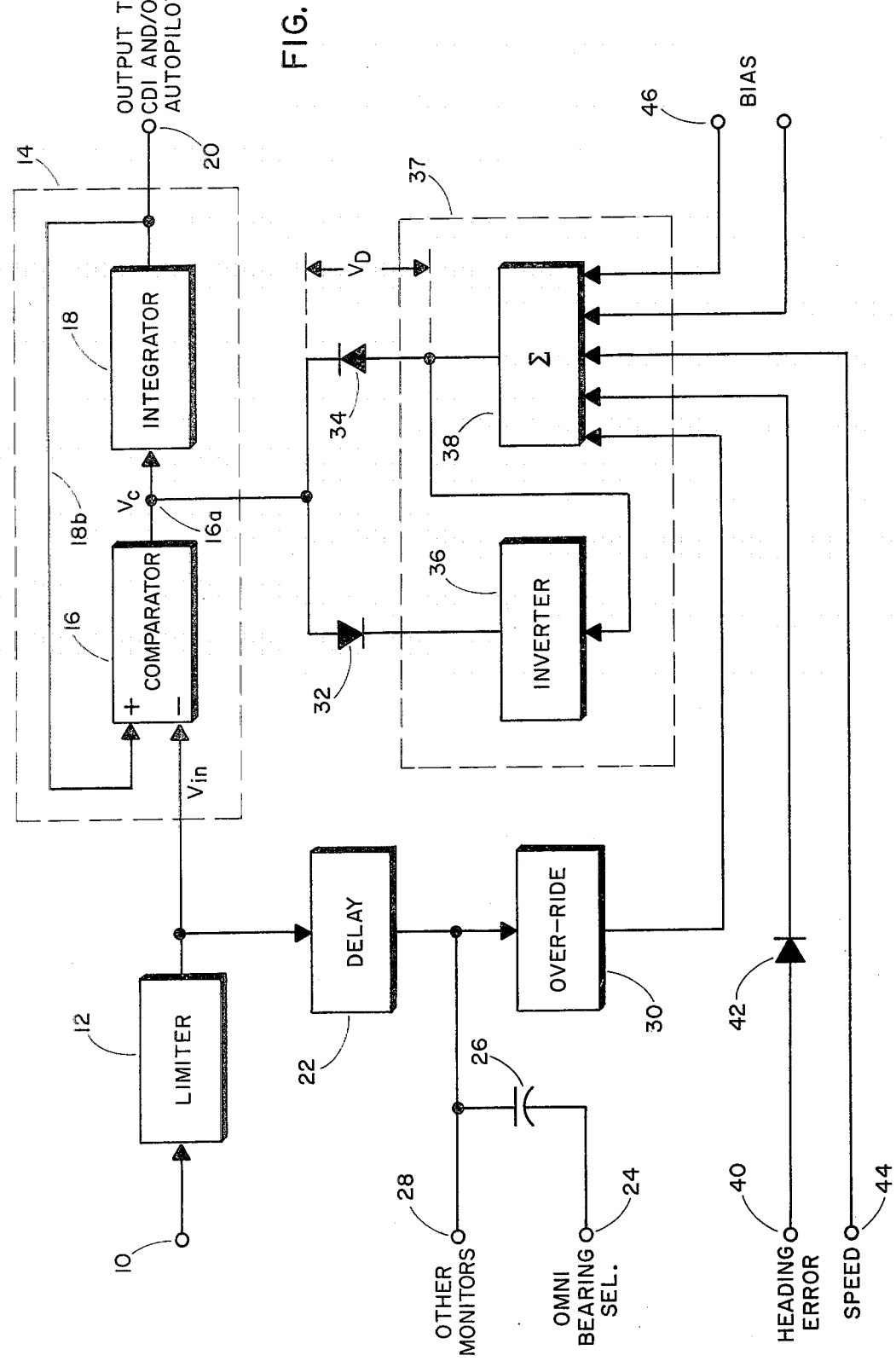
FIG. 1 is a simplified block diagram which illustrates the invention.

Refer to FIG. 1 where there is shown an adaptive rate filter whose purpose is to minimize the effects of VOR signal perturbations which exceed the limits determined by control voltage $V_c$ at the node 16a. A d.c. voltage related to a received VOR signal and generally indicative of bearing of the receiver from a VOR station is impressed at terminal 10 and limited by limiter 12. A unity inverter 14 is comprised of comparator 16 and integrator 18 communicating through node 16a. A feedback circuit represented by line 18b applies the unattenuated output of integrator 18 to the non-inverting input terminal of comparator 16. A bipolar summer comprised of summer 38 having an input communicating through diode 34 with node 16a and additionally through inverter 36 and diode 32 to node 16a, limits the voltage at node 16a ($V_c$) in accordance with various parameters. For example, a difference above a predetermined amount between the signal at the inverting input terminal of comparator 16 and the output signal of integrator 18 will be detected and delayed slightly by delay element 22 and then applied to override circuit 30 which produces a large signal which operates through bipolar summer 37 to increase the speed of integrator 18 so that the two signals become equal rapidly. Delay element 22 also prevents transients at the filter input from upsetting the operation of the filter and also maintains override for a few seconds after the aircraft has acquired a newly selected course so as to allow full settling of the CDI and/or autopilot. In addition, manipulations of the Omni-Bearing Selector (not shown) by which the pilot selects the bearing or track to be flown, are detected at terminal 24 and coupled through capacitor 26 to override circuit 30 to again match the input and output signals of filter 14. The speed of integration is also responsive to a heading error signal, from a source not shown, applied at terminal 40. Heading error is the difference between the aircraft heading, usually magnetic heading, and the Omni-Bearing Selector setting. This signal is available from the Horizontal Situation Indicator (HSI) and is of the type known to those skilled in this art to be a frequency signal whose amplitude is related to heading error. The heading error signal is thus applied through the rectifier comprised of diode 42 to bipolar summer 37. In like manner, the aircraft speed signal, which is normally a d.c. voltage signal, can be impressed at terminal 44 to control the integrator speed. Optionally, a signal related to the distance of the receiver from the station and normally derived from distance measuring equipment (DME) can be used in a similar manner to effect the speed of integration. A permanent bias at terminals 46 sets the nominal speed of the integrator. It should now be obvious that other aircraft performance monitors may be used to control the speed of integration especially where the monitor indicates that for some reason filter 14 output is lagging more than desirable. These monitors can be used to apply signals at terminals such as terminal 28.

In analyzing the operation of the device of FIG. 1 it should be obvious that if the rate of change of the signal at the input of filter 14 does not exceed the rate at which the signal on the filter output can vary, then the control voltage $V_c$ should not be limited and the filter output will track its input with essentially zero lag. In this condition the output of summer 37 is determined only by the bias input with control voltage $V_c$ differing therefrom by the diode drop $V_D$.

The rate at which the voltage signal at the filter 14 output may vary ($V_o$) is a function of control voltage $V_c$ and the integrator gain constant, assumed to be equal to 1/CR, or:

$$V_o = \frac{V_c}{CR} \text{volts/second}.$$

But, $V_c$ is related to or a function of the summation of several variables: heading, speed, override, distance, etc. Therefore, the maximum rate of change of filter 14 output is a function of the various inputs to bipolar summer 37. The fact that summer 37 is bipolar permits bidirectional filter rate control.

The following examples show the operation of the device of FIG. 1:

EXAMPLE: (NOT RATE LIMITING)

Let 1/CR = 0.1 integrator gain constant
$A_1 = 10^4$ comparator 16 gain
$A_2 = 10^4$ integrator 18 gain
$V_x = 7V$ output of summer 37
$V_D = 0.25V$ (Schottky diodes)

$V_{IN} = 0.1 \sin 2\pi t$
$V_{IR}$ = Maximum rate of variation of $V_{IN}$
$V_{OR}$ = Maximum rate of variation of filter 14 output then $\quad V_{IR} = \dfrac{d(V_{IN})}{dt} = 0.628$ volts/second, and $\quad V_{OR} = \dfrac{V_x - V_D}{CR} = (6.75)(0.1) = 0.675$ volts/second, since $V_{OR} > V_{IR}$ then the filter does not rate limit and the filter output voltage will track the input voltage with a maximum lag as follows, where:

differential comparator 16 input voltage = $E_d$ $$E_d = \dfrac{V_{IR}CR}{A_1}$$

to satisfy $V_{OR} - V_{IR}$.
The time lag ($t$) required to produce $E_d$ is:

$$t = \dfrac{\arcsin \dfrac{E_d}{RC}}{2} = \dfrac{\arcsin \dfrac{V_{IR}}{A_1}}{2}$$

$$= 1/2 \arcsin \dfrac{0.628}{10^4} \text{ seconds}$$

$$= 0.56 \text{ milliseconds.}$$

This delay is considered negligible.
Example: (Rate Limiting)
When the rate of change of $V_{IN}$ exceeds the limit determined by $V_c$, the output voltage can no longer follow $V_{IN}$. Under these conditions the resultant differential voltage $E_d$ will drive comparator 16 into saturation and $V_c$ will be clamped to a value determined by $V_x$. The output will then be limited and triangular (ramp toward $V_{IN}$ as a limiting value).
In this example:
Let $V_{IN} = 10 \sin 6t$ Peak $\quad V_o = \dfrac{V_{OR}}{2f} = \dfrac{0.675}{6} = 0.1125$ volts Attenuation $= 20 \log \dfrac{10}{0.1125} = 20 \log 89 = 39$ db.

Thus, $V_o$ is 39 db below $V_{IN}$ and lags by about 90°.

Figure 2:
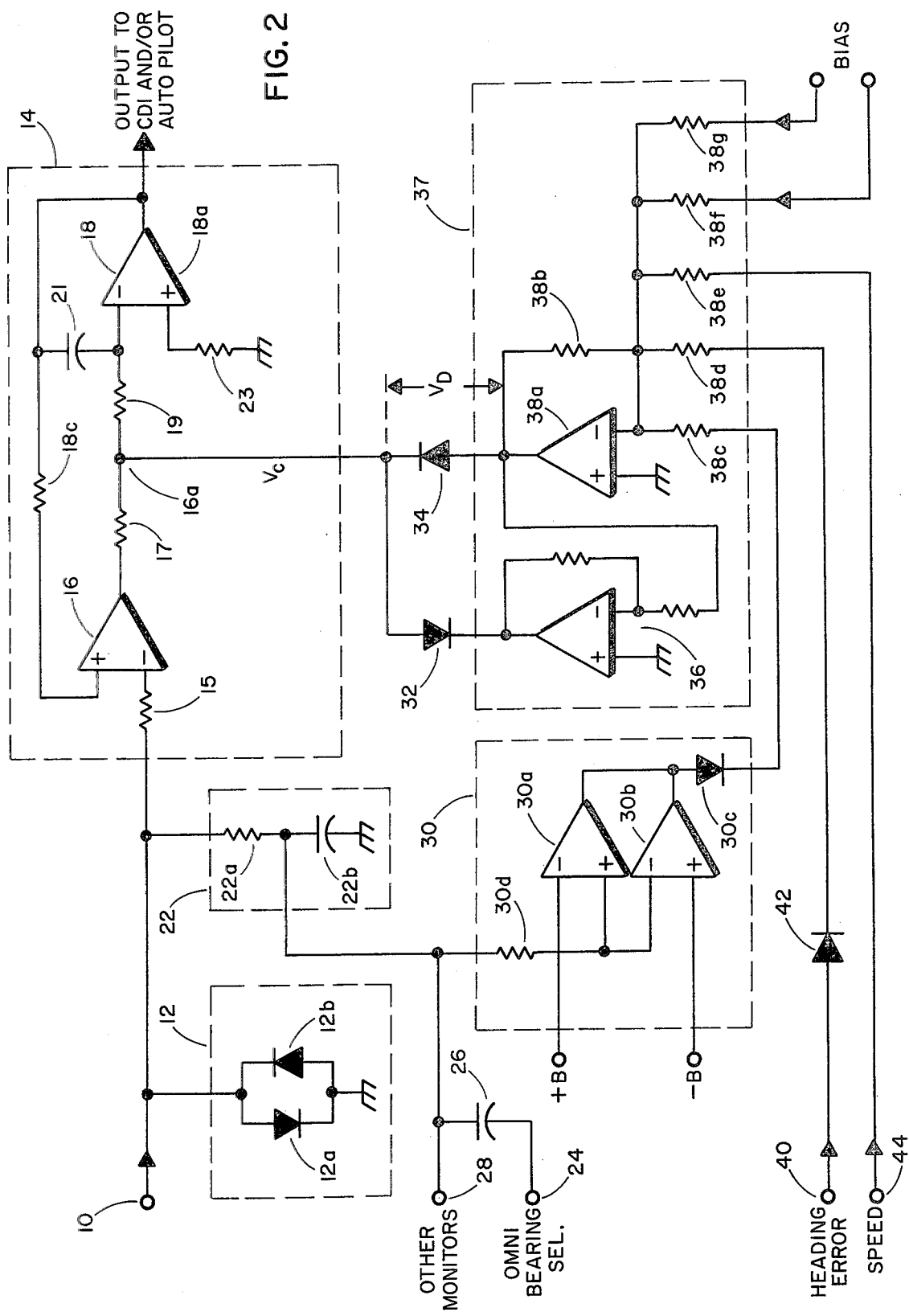
FIG. 2 is a schematic of one form of the invention.

Refer now to FIG. 2 which shows the device of FIG. 1 in greater detail and wherein like elements are designated by identical numerals. Limiter 12 is seen to be comprised of Schottky diodes 12a and 12b connected between terminal 10 and a common terminal herein designated as ground so as to limit both positive and negative excursions of the signal at terminal 10. Delay 22 is comprised of resistor 22a and capacitor 22b connected in series between terminal 10 and ground. Terminal 10 is connected through resistor 15 to the inverting input terminal of differential or operational amplifier 16. The output of amplifier 16 is connected through the serial arrangement of resistors 17 and 19 to the inverting input terminal of integrator 18 which is comprised of operational amplifier 18a, shunt capacitor 21 connected between the inverting input terminal and the output terminal, resistor 23 connected between the non-inverting input terminal and ground, and the aforementioned resistor 19. Node 16a is at the junction of resistors 17 and 19. Feedback resistor 18c connects the filter output (output of operational amplifier 18a) with the non-inverting input terminal of amplifier 16.

The bipolar summer 37 includes summer 38 which is comprised of operational amplifier 38a, shunt resistor 38b connected between its output and inverting input terminals, and resistors 38c, 38d, 38e, 38f, 38g, etc. as required to connect the various summer inputs to the inverting input terminal. It can be seen that inverter 36 is basically another operational amplifier, while diodes 32 and 34 are preferably Schottky diodes.

Override circuit 30 is comprised of operational amplifiers 30a and 30b connected as comparators and having a common output terminal connected through diode 30c to the bipolar summer. The inverting input terminal of operational amplifier 30a is connected to a positive voltage terminal, while the non-inverting input terminal of operational amplifier 30b is connected to a negative voltage terminal. The non-inverting input terminal of operational amplifier 30a is connected in common with the inverting input terminal of operational amplifier 30b through resistor 30d to delay 22. When the output of delay 22 lies between the positive and negative bias inputs to the override circuit, diode 30c is back-biased and no input to the bipolar summer from the override circuit is provided. However, when the delay output exceeds the bounds of the bias one or the other of operational amplifiers 30a and 30b saturate to forward-bias diode 30c and apply a relatively large signal to the bipolar summer which in response thereto generates a large output voltage resulting in a large control voltage $V_c$. It will be remembered that the speed with which the output of filter 14 tracks its input is dependent upon $V_c$. In this case, the step output of override circuit 30 is made large enough to decrease the integration time to a very small value so that the output of filter 14 rapidly reaches the input (inverted).

As previously mentioned terminals 24 and 28 are also connected to the input of override circuit 30. The response of the override circuit and hence, the filter response is identical for signals at these latter terminals as for signals from delay 22 described above.

It can be seen with respect to FIGS. 1 and 2 that through the use of the bipolar summer and control voltage $V_c$ to control the rate of integration and hence, the rate at which the filter output will vary, any number of parameters can be used to adjust the filter response rate.

Figure 3:
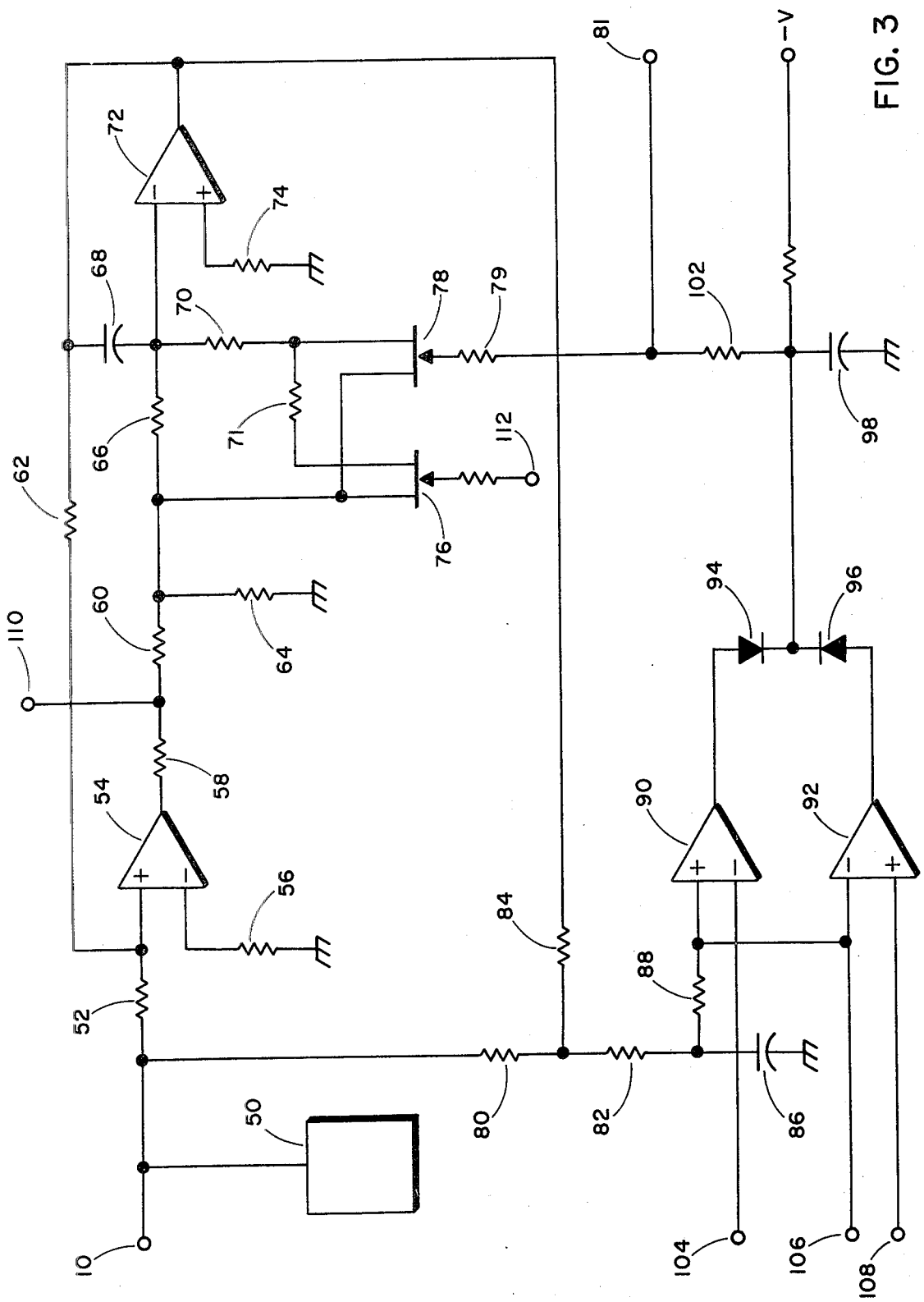
FIG. 3 is a schematic of another form of the invention.

Refer now to FIG. 3 where a different form of the invention is illustrated. As before, an input signal at terminal 10 is subject to a limiter 50 and connected through resistor 52 to the non-inverting input terminal of operational amplifier 54 connected as a comparator. The output of comparator 54 is connected through the serial string of resistors 58, 60 and 66 to the inverting input terminal of operational amplifier 72. A resistor 64 is connected between the common junction of resistors 60 and 66 and ground. Operational amplifier 72 is connected as an integrator by reason of capacitor 68 connected between its output terminal and its inverting input terminal. The inverting input terminal of operational amplifier 54 and the non-inverting input terminal of operational amplifier 72 are connected, respectively, through resistors 56 and 74 to ground.

Resistor 66 is shunted by the source-drain circuit of FET 76, resistors 70 and 71 and also by the source-drain circuit of FET 78 and resistor 70. In the present embodiment the speed of integration is normally (when FETs 76 and 78 are pinched off) determined by resistor 66 and capacitor 68. When one of the FETs conducts the integration time is shortened in accordance with the effective decrease of resistance due to the shunt resistance introduced. Generally, resistor 70 is quite small so that if FET 78 is conductive the integration speed becomes very fast. If only FET 76 is conductive the integration speed lies between the normal speed and the fast speed.

The integration speed is also controllable by a voltage at terminal 110 which corresponds to the junction of resistors 58 and 60. This terminal can be the output terminal of a summer such as the bipolar summer of FIGS. 1 and 2 or of the diodes at the output of that summer, so as to provide even greater utility to this circuit.

The gate electrode of FET 76 is resistively coupled to terminal 112. A signal at this terminal will cause FET 26 to conduct so that an intermediate integration speed results. Suitably, a signal is applied at this terminal when the associate aircraft instrument is switched to an approach mode (when the aircraft is close to a station) where distance control of the integration speed is not otherwise exerted.

Terminal 10 is connected through the serial arrangement of resistors 80 and 84 to the filter output. In addition, the junction of these resistors is connected through resistor 82 and capacitor 86 to ground, and through resistor 82 and resistor 88 to the non-inverting input terminal 106 of operational amplifier 90 (connected as a comparator) and to the inverting input terminal 106 of operational amplifier 92 (also connected as a comparator). The output terminals of these operational amplifiers are connected to each other through back-to-back diodes 94 and 96 whose common cathode is connected through resistor 100 to a negative voltage terminal −V and through capacitor 98 to ground and also through resistors 102 and 79 to the gate electrode of FET 78. It will be remembered that when FET 78 is conductive integration speed becomes very fast so that the filter output rapidly acquires the filter input. As previously mentioned this is desirable under certain conditions such as (1) when the filter output deviates from its input by more than a predetermined amount, or (2) when the Omni-Bearing Selector (OBS) is manipulated. It is also desirable that FET 78 remain pinched-off if the NAV signal from which the filter input signal is derived is temporarily lost. To accomplish these functions terminal 106 is connected to sense manipulation of the OBS, while terminal 108 is energized when the NAV signal is lost.

Operational amplifiers 90 and 92 are normally at terminals 104 and 108 (by means not shown) biased so that both are negatively saturated, diodes 94 and 96 are back-biased and FET 78 is pinched-off by the −V voltage. If the voltage at terminal 10 deviates from the filter output voltage by more than an amount determined by the bias on operational amplifiers 90 and 92 and the value of resistors 80 and 84 either operational amplifier 90 or 92 becomes positively saturated, depending on whether the voltage at terminal 10 deviates in a positive or a negative sense. This forward-biases one of the diodes 94 or 96 to apply a positive signal through resistors 102 and 79 to turn on FET 78 until the deviation drops to predetermined limits. Of course, if the NAV signal is temporarily lost it might be expected that FET 78 would become conductive since the signal at terminal 10 would, of course, also be lost. However, the loss of the NAV signal is detected by means, not shown but which are known in the art, which impresses a negative voltage at terminal 81 to maintain FET 78 pinched-off. It may be desirable to limit the permissible time duration of the negative signal at terminal 81.

Switching of the OBS is detected at terminal 108 by means such as a capacitor (not shown) which senses the resultant sharp voltage change. When the OBS is switched operational amplifier 92 is positively saturated to forward-bias diode 96 which, as previously explained, causes FET 78 to conduct to decrease the integration time.

From the teachings herein one skilled in the art should be able to derive modifications and alterations thereof. Accordingly, this invention is to be limited only by the true scope and spirit of the appended claims.

The invention claimed is:

1. An adaptive rate filter for use in an aircraft navigation system installed in an aircraft which includes receiver means for generating a navigation signal in response to a signal received from a remote station wherein said navigation signal includes at least a component related to the bearing of the receiver means from the remote station and including means for generating at least one voltage signal related to a predetermined aircraft parameter, said adaptive rate filter comprising:
   means for generating a second voltage signal related to the difference of said component and a feedback signal;
   means for limiting said second voltage signal at least in accordance with said one voltage signal; and,
   means for integrating the limited second voltage signal, the absolute value of the results of the integration comprising the absolute value of said feedback signal.

2. The adaptive rate filter of claim 1 wherein said navigation system includes means for generating a plurality of voltage signals related individually and respectively to a predetermined plurality of aircraft parameters, said means for limiting comprising:
   means for summing said plurality of voltage signals and for limiting said second voltage signal in accordance with the resultant sum.

3. The adaptive rate filter of claim 2 wherein one of said plurality of voltage signals comprises a voltage signal related to the heading error of said aircraft, the heading error being the heading deviation of the aircraft from a selected heading.

4. The adaptive rate filter of claim 3 wherein another of said plurality of voltage signals comprises a voltage signal related to the speed of said aircraft.

5. The adaptive rate filter of claim 2 wherein said means for summing comprises a bipolar summer.

6. The adaptive rate filter of claim 1 wherein said at least one voltage signal comprises a voltage signal related to the heading error of said aircraft, the heading error being the heading deviation of the aircraft from a selected heading.

7. The adaptive rate filter of claim 1 wherein said means for generating and said means for integrating together comprise a unity amplifier whereby said feedback signal tends to equal said component.

8. An adaptive rate filter for use in an aircraft navigation system installed in an aircraft which includes receiver means for generating a navigation signal in response to a signal received from a remote station wherein said navigation signal includes at least a component related to the bearing of the aircraft from the remote station and including means for generating at least one signal related to a predetermined aircraft parameter, said adaptive rate filter comprising:
   means for generating a voltage signal related to the difference of said component and a feedback signal;
   means for integrating said voltage signal, the results of said integration being related to said feedback signal; and,
   means responsive to at least said one signal for adjusting the speed of integration of said means for integrating.

9. The adaptive rate filter of claim 8 wherein said means for integrating includes at least resistance and capacitance means, the value of which determine the speed of integration, said means for adjusting comprising means responsive to at least said one signal for varying the value of at least one of said resistance and capacitance means.

10. The adaptive rate filter of claim 9 wherein said navigation system includes means for generating a plurality of signals related individually and respectively to a predetermined plurality of aircraft parameters, said means for adjusting additionally comprising means for limiting said voltage signal in accordance with at least another of said plurality of signals whereby the speed of integration is further controlled.

11. The adaptive rate filter of claim 8 with additional means sensing the deviation of said feedback signal from said component for adjusting the speed of integration of said means for integrating to a relatively high speed when the deviation exceeds a predetermined amount.

12. The adaptive rate filter of claim 8 wherein the absolute value of said feedback signal is equal to the absolute value of the results of said integration.

13. The adaptive rate filter of claim 12 wherein said means for generating and said means for integrating comprise a unity amplifier whereby said feedback signal tends to equal said component.

14. The adaptive rate filter of claim 8 wherein said means for adjusting the speed of integration comprises means for limiting said voltage signal at least in accordance with said one signal.

15. The adaptive rate filter of claim 14 wherein said means for generating and said means for integrating comprise a unity amplifier whereby said feedback signal tends to equal said component, the absolute value of said feedback signal being equal to the absolute value of the results of the integration.

* * * * *